(12) United States Patent
Gruson

(10) Patent No.: US 11,009,145 B2
(45) Date of Patent: May 18, 2021

(54) VALVE ACTUATOR, VALVE, AND MACHINE CONSISTING THEREOF

(71) Applicant: Serac Group, La Ferte Bernard (FR)

(72) Inventor: Bertrand Gruson, Breville sur Mer (FR)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 16/354,978

(22) Filed: Mar. 15, 2019

(65) Prior Publication Data

US 2019/0285193 A1 Sep. 19, 2019

(30) Foreign Application Priority Data

Mar. 16, 2018 (FR) ...................................... 18 52267

(51) Int. Cl.
| | | |
|---|---|---|
| *F16K 11/044* | (2006.01) | |
| *F16K 31/08* | (2006.01) | |
| *F16K 31/06* | (2006.01) | |
| *F16K 37/00* | (2006.01) | |
| *B67C 3/28* | (2006.01) | |

(52) U.S. Cl.
CPC .......... *F16K 31/08* (2013.01); *F16K 31/0634* (2013.01); *F16K 31/0641* (2013.01); *F16K 31/082* (2013.01); *F16K 37/0041* (2013.01); *B67C 3/28* (2013.01); *Y10T 137/86895* (2015.04)

(58) Field of Classification Search
CPC .............. F16K 31/0634; F16K 31/082; Y10T 137/86879; Y10T 137/86895
See application file for complete search history.

(56) References Cited

U.S. PATENT DOCUMENTS

| | | | | |
|---|---|---|---|---|
| 4,644,969 A | * | 2/1987 | Watanabe | ........... F16K 31/1221 137/625.26 |
| 5,069,422 A | * | 12/1991 | Kawamura | ............... F01L 9/04 123/90.11 |
| 5,184,773 A | * | 2/1993 | Everingham | ...... B60H 1/00485 137/115.25 |
| 5,897,096 A | * | 4/1999 | Nakano | ................. F16K 31/082 251/65 |
| 2005/0279415 A1 | | 12/2005 | Xu et al. | |

(Continued)

FOREIGN PATENT DOCUMENTS

| | | |
|---|---|---|
| DE | 102009021639 A1 | 11/2010 |
| GB | 2271668 A | 4/1994 |

(Continued)

*Primary Examiner* — Robert K Arundale
(74) *Attorney, Agent, or Firm* — Muncy, Geissler, Olds & Lowe, P.C.

(57) ABSTRACT

A valve actuator includes moving equipment arranged to cause a plug of said equipment to slide along a given axis between two end positions. The moving equipment includes a core constrained to move in translation with the plug along the given axis. The actuator also includes a coil lying between two rings of ferromagnetic material, all three of which are secured to a frame of the actuator so as to surround the core, which itself carries two magnets mounted in opposition on the core level with the coil, a ring of ferromagnetic material lying between the two magnets that also lie between two other rings of ferromagnetic material. A valve and a machine may be fitted with such an actuator.

15 Claims, 3 Drawing Sheets

(56) References Cited

U.S. PATENT DOCUMENTS

| | | | | |
|---|---|---|---|---|
| 2006/0145797 | A1* | 7/2006 | Muramatsu | F04B 17/042 335/220 |
| 2007/0241298 | A1* | 10/2007 | Herbert | F16K 7/16 251/129.04 |
| 2014/0001387 | A1* | 1/2014 | Schuler | H01F 7/1653 251/129.15 |
| 2016/0327176 | A1* | 11/2016 | Nemoto | F16K 31/082 |
| 2017/0067572 | A1* | 3/2017 | Rovera | F16K 31/082 |

FOREIGN PATENT DOCUMENTS

| | | |
|---|---|---|
| JP | H11248025 A | 9/1999 |
| JP | H11315950 A | 11/1999 |

\* cited by examiner

VALVE ACTUATOR, VALVE, AND MACHINE CONSISTING THEREOF

The invention relates to a valve actuator.

The invention also relates to a valve equipped with such an actuator.

The invention also relates to a machine including such a valve and such an actuator, by way of example and in non-limiting manner, a machine such as a machine for transporting containers.

TECHNOLOGICAL BACKGROUND OF THE INVENTION

In order to enable an inlet to be associated with two different outlets, it is known to make use of three-port valves.

These valves are generally associated with pneumatic valve actuators, which is incompatible with aseptic environments complying with very strict hygiene and security standards. Under such circumstances, in order to be able to use valves of this type in aseptic environments, it would be appropriate to arrange the actuator outside the aseptic environments in question, which is naturally not very practical.

In order to mitigate that drawback, proposals have been made to have recourse to electrical valve actuators. Nevertheless, the actuator then tends to heat up quickly in operation, which is particularly problematic given that the actuator is sometimes subjected to temperature constraints that are already severe.

OBJECT OF THE INVENTION

An object of the invention is to propose a valve actuator that is less subjected to heating up.

An object of the invention is also to propose a valve fitted with such an actuator.

An object of the invention is also to propose a machine including such an actuator and such a valve.

BRIEF DESCRIPTION OF THE INVENTION

The invention thus provides a valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis.

According to the invention, the actuator then includes a coil lying between two rings of ferromagnetic material, all three of which are secured to a frame of the actuator so as to surround the core, which itself carries two magnets mounted in opposition on the core level with the coil, a ring of ferromagnetic material lying between the two magnets, that also lie between two other rings of ferromagnetic material, applying power to the coil causing one of the magnets carried by the core to be attracted and the other magnet to be repelled depending on the direction in which the coil is powered, co-operation between the pair of rings of the frame and a respective one of the pairs of rings of the core serving to lock the plug in each of its end positions when the coil ceases to be powered, the moving equipment also having at least two elastically deformable elements connected to the core in such a manner that the pairs of rings of the core are offset from the pair of rings of the frame while locking the plug in each of its end positions.

As a result, the invention limits any risk of the actuator overheating, since the coil is powered only for the time required to cause the core (and thus the plug) to switch over from one position to another. This length of time is advantageously short (being of the order of a few tens of milliseconds), thereby considerably limiting the heating up of the coil and thus of the actuator.

Advantageously, a single electric pulse suffices to cause the plug to go from one position to another position.

Such a valve actuator is advantageously suitable for use in aseptic environments because it makes use of electrical power.

It should be observed that the elastically deformable elements are arranged in such a manner that each pair of rings of the core is offset from the pair of rings of the frame when the core is locked: as a result, when the coil is powered, the elastically deformable elements facilitate switching the core (and thus the plug) over from one position to another position.

Optionally, the elastically deformable elements are springs.

Optionally, a first spring of the moving equipment is arranged between the core and the frame, and a second spring of the moving equipment is arranged between the plug and a valve body.

Optionally, the moving equipment includes a third spring arranged between the core and the plug.

Optionally, the moving equipment includes a sealing element arranged between the plug and the frame of the actuator.

Optionally, the sealing element is a bellows.

Optionally, the actuator includes a proximity sensor for detecting the position of the core.

Optionally, the sensor is an inductive sensor.

The invention also provides a valve including such a valve actuator.

The invention also provides a machine including such a valve actuator and such a valve.

Optionally, the machine includes a control unit connected to the actuator in order to manage powering the coil of the actuator with pulses.

Other characteristics and advantages of the invention appear on reading the following description of a particular, non-limiting embodiment of the invention.

BRIEF DESCRIPTION OF THE DRAWINGS

The invention can be better understood in the light of the following description given with reference to the accompanying figures, in which.

DETAILED DESCRIPTION OF A PARTICULAR EMBODIMENT OF THE INVENTION

Figure 1:
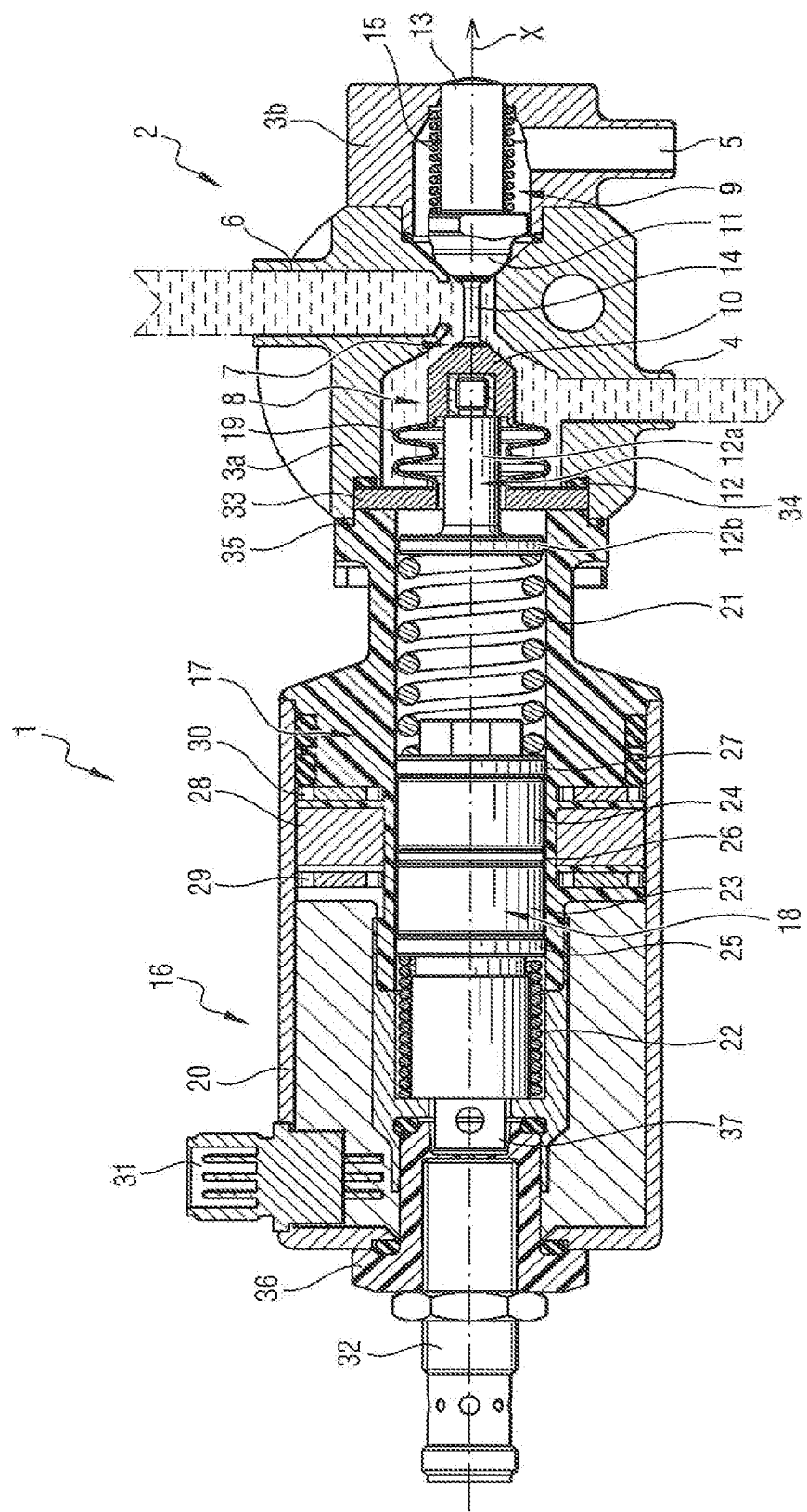
FIG. 1 is a section view of a valve actuator in a particular embodiment of the invention together with the associated valve, the plug being in a first of its two end positions.

With reference to the various figures, the valve actuator, given overall reference 1, in a particular embodiment of the invention is associated with a valve, given overall reference 2. In this example, the valve 2 has a valve body 3a in which there are provided two outlets 4 and 5 and an admission channel 6 connected to the two outlets 4 and 5, said valve body 3a being closed at a second of its ends by a cover 3b of the valve 2, the actuator 1 being mounted on the valve 2 at a first end of the valve body 3a. In this example, the valve 2 is thus a three-port valve.

Said valve 2 and said actuator 1 are mounted together on a carousel 101 of a machine, given overall reference 100, for example a machine for transporting containers R (such as a machine for decontaminating containers, a machine for filling containers, . . . ). In the present example, the carousel 101 has a plurality of valves and valve actuators that are identical and that are in accordance with the particular embodiment of the invention.

Figure 2:
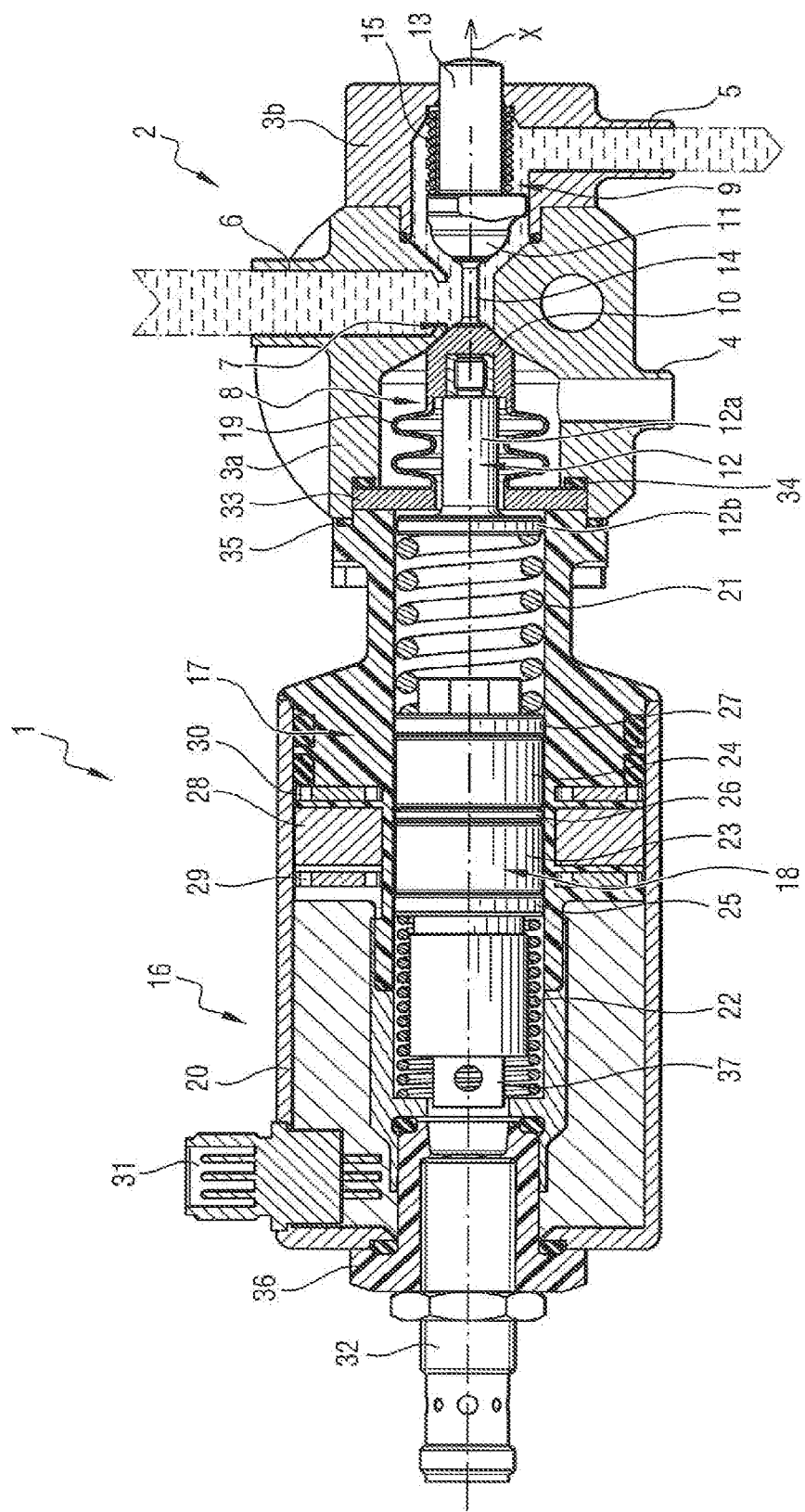
FIG. 2 is a section view of the actuator and of the valve as shown in FIG. 1 when the plug is in the second of its two end positions.
Figure 3:
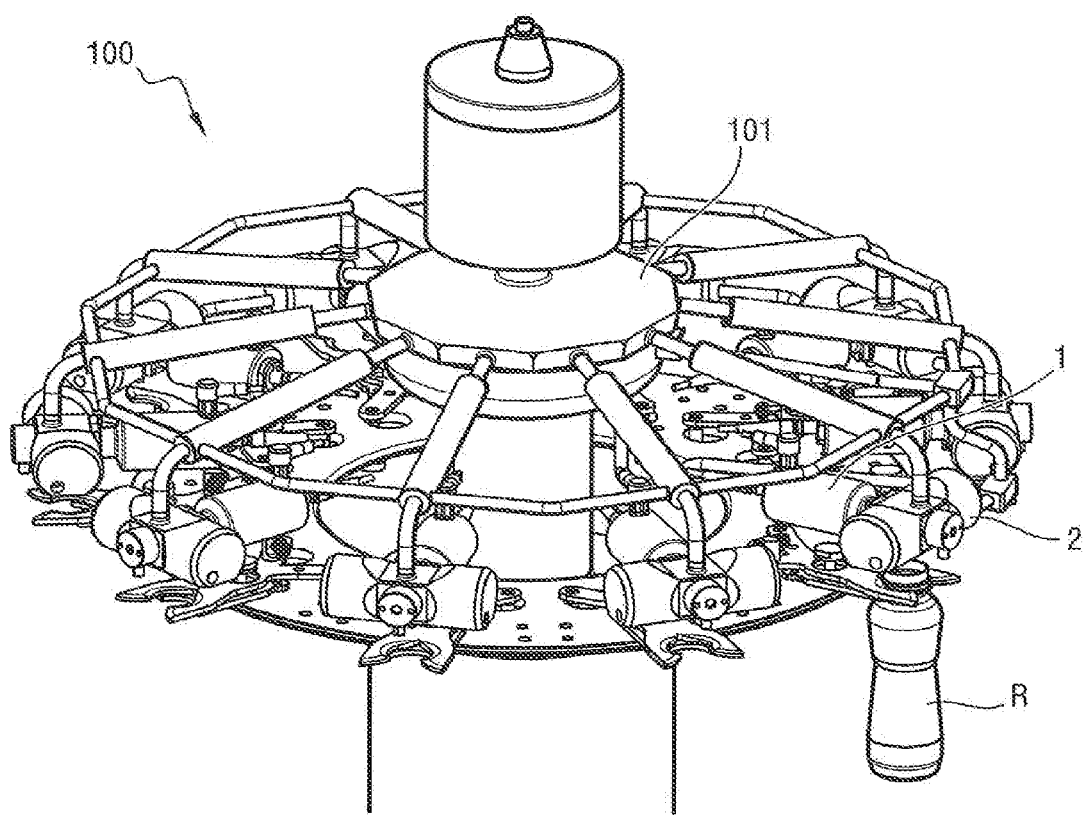
FIG. 3 is a three-dimensional view of a portion of a machine including the actuator and the valve as shown in FIG. 1.

The valve 2 has a plug 7 extending in the valve 2 so as to be capable in this example of moving in translation between two end positions along a given axis X at the connection between the admission channel 6 and the two outlets 4 and 5. In a first end position, the plug 7 allows the admission channel 6 to be put into communication with the first outlet 4 (as shown in FIG. 1), while blocking the passage of fluid towards the second outlet 5. In the second end position, the plug 7 serves to put the admission channel 6 into communication with the second outlet 5 (as shown in FIG. 2), while preventing fluid from passing to the first outlet 4.

For this purpose, the plug 7 has two valve members 8 and 9, each valve member 8 and 9 being shaped in this example so as to present a body 12, 13 and a head 10, 11 in order to block temporarily the passage of fluid by co-operating with seats formed in the valve body 3a. The valve members 8 and 9 are also secured to each other by a spacer 14 having its ends connected to respective ones of the valve member heads 10 and 11.

Furthermore, the body 13 of the second valve member 9 is shaped as a rod that is slidably received in the cover 3b to slide along the axis X, thereby facilitating guidance of said valve member 9, the rod being extended by the head 11 of the second valve member 9.

The second valve member 9 has a first spring 15 connecting the second valve member 9 to the valve 2 and more exactly in this example to the cover 3b of said valve 2. In this example, the first spring 15 surrounds the body 13 of the second valve member 9 and is fastened at a first end to the head 11 of the second valve member 9 and at a second end to the cover 3b. The first spring 15 is a helical spring. The first spring 15 extends along the axis X.

The body 12 of the first valve member 8 is shaped as a piston having a fastener rod 12a fastened to the head 10 of the first valve member 8, and a piston head 12b.

In order to improve sealing between the actuator 1 and the valve 2, the first valve member 8 has a sealing element extending between the head 10 of the first valve member 8 and a wall 33 of the actuator 1. As a result, the sealing element surrounds the portion of the body 12 of the first valve member 8 that extends inside the valve 2. In this example, the sealing element is a bellows 19. By way of example, the bellows 19 is based on polytetrafluoroethylene (PTFE) or indeed on some other resilient material.

By way of example, the wall 33 is secured to the second end of the actuator 1 mounted in the valve 2. The wall 33 is typically fastened to a frame 16 of the actuator 1 (extending along the axis X) and it is mounted in sealed manner on the valve 2 by means of an O-ring 34. A second O-ring 35 is arranged between the frame 16 and the valve 2 substantially at the outer circumference of said frame 16. Preferably, at least the portion of the frame 16 that is in contact with the valve 2 is made of polyetheretherketone (PEEK). The frame 16 and the wall 33 are thus secured to each other.

In particular manner, the head 10 of the first valve member 8 and the bellows 19 are made as a single piece, thereby further improving sealing between the actuator 1 and the valve 2. More particularly, the bellows 19 and the wall 33 are constituted by a single part further improving sealing between the actuator 1 and the valve 2. In the present example, all three of the bellows 19, the wall 33, and the head 10 of the first valve comprise a single part.

Thus, in this example, the plug 7 comprises:
the first valve member 8;
the second valve member 9; and
the spacer 14.
The first valve member 8 also comprises:
the head 10;
the body 12 including the fastener rod 12a and the piston head 12b;
the bellows 19; and
in this example the wall 33.
Furthermore, the second valve member 9 comprises:
the head 11;
the body 13; and
the first spring 15.

The valve 1 also includes a slide 17 that is arranged in the frame 16 in order to cause the plug 7 to slide along the axis X between its two end positions.

For this purpose, the slide 17 comprises a core 18 extending in a straight line along the axis X inside the frame 16 so as to be slidably mounted in the frame 16 along the axis X.

The core 18 is connected at a first of its ends to the plug 7 so as to be constrained to move in translation with the plug 7 along the axis X. In this example, the core 18 is connected to the piston head 12b of the body 12 of the first valve member 8, i.e. to the portion of the first valve member 8 that extends inside the actuator 1 and outside the valve 2.

In a preferred embodiment, the core 18 and the plug 7 are not fastened directly to each other, but are connected together via a second spring 21 of the slide 17, which second spring 21 is thus fastened at a first end to the core 18 and at a second end to the plug 7 (specifically to the piston head 12b of the body 12 of the first valve member 8). The second spring 21 is a helical spring. The second spring 21 thus extends along the axis X.

Not only does the second spring 21 allow forces to be transmitted between the core 18 and the plug 7, but the second spring 21 also serves to damp the movement of the plug 7 when the plug 7 moves between its two end positions. In addition, the second spring 21 serves to take up the clearance between the throat of the core 18 and the shorter stroke of the plug 7.

The slide 17 also has a third spring 22 that connects the core 18 to the frame 16. Typically, the third spring 22 is fastened at a first of its ends to the frame 16 and at a second of its ends to the core 18, in this example to the end of the core 18 remote from its end that is fastened to the second spring 21. The third spring 22 is a helical spring. The third spring 22 thus extends along the axis X.

In particular manner, the first spring 15 and the third spring 22 present stiffnesses that are less than the stiffness of the second spring 21. Typically, the second spring 21 presents stiffness lying in the range 25 newtons per millimeter (N/mm) to 35 N/mm. The first spring 15 and the third spring 22 have stiffnesses that are less than 1 N/mm. Preferably, the first spring 15 is of stiffness greater than the stiffness of the third spring 22.

The slide 17 thus comprises:
- the core 18;
- the second spring 21; and
- the third spring 22.

The core 18 is thus mounted in the frame 16 solely via the second spring 21 and the third spring 22.

The valve 1 thus serves to create moving equipment E made up of elements that are connected to move together in translation along the axis X. In this example, the moving equipment E thus comprises the plug 7 and the slide 17, i.e. in succession:
- the first spring 15;
- the second valve member 9;
- the spacer 14;
- the first valve member 8;
- the second spring 21;
- the core 18;
- the third spring 22.

Under such circumstances, a movement of the core 18 acts (via the second spring 21) to entrain a movement of the plug 7 along the axis X.

The core 18 also has two magnets 23 and 24 that are mounted in opposition on the core 18 and that are separated from each other by a ring 26 of ferromagnetic material, the two magnets 23 and 24 also lying between two other rings 25 and 27 of ferromagnetic material.

Along the axis X, the following are thus arranged in succession on the core 18:
- a first ring 25 of ferromagnetic material;
- a first magnet 23;
- a second ring 26 of ferromagnetic material;
- a second magnet 24;
- a third ring 27 of ferromagnetic material.

The magnets 23 and 24 and the rings 25, 26, and 27 are also shaped in such a manner as to be coaxial with the core 18 and the axis X, surrounding the outside of the core 18.

The magnets 23 and 24 and the rings 25, 26, and 27 are fastened to the core 18 in this example in such a manner as to be in contact with one another. They thus define a first pair of springs formed by the first ring 25 and the second ring 26, and a second pair of rings formed by the second ring 26 and the third ring 27.

Furthermore, the actuator 2 includes a coil 28 fastened to the frame 16 so as to surround externally the core 18 together with the magnets 23 and 24 and the rings 25, 26, and 27 carried by the core 18. The coil 28 is thus coaxial with the core 18.

The actuator 2 also includes a fourth ring 29 of ferromagnetic material and a fifth ring 30 of ferromagnetic material fastened to the frame 16 in such a manner as to surround externally the core 18 together with the magnets 23 and 24 and the rings 25, 26, and 27 carried by the core 18. The fourth ring 29 and the fifth ring 30 are thus coaxial with the core 18. The fourth ring 29 and the fifth ring 30 form a third pair of rings.

The fourth ring 29 is juxtaposed with the first annular face of the coil 28 and the fifth ring 30 is juxtaposed with the second annular face of the coil 28, said fourth and fifth rings 29 and 30 nevertheless not touching the coil 28.

By way of example, the rings 25, 26, 27, 29, and 30 are made of 630 stainless steel.

By way of example, the magnets 23 and 24 are made of neodymium.

The rod of the core 18 carrying the magnets 23 and 24 and the rings 25, 26, and 27 may for example be made of a metal material (such as a stainless steel, e.g. 304 stainless steel). Preferably, the rod is extended at at least one of its two ends (and preferably at both ends) by plugs forming part of the core 18. Typically, the plugs are made of a plastics material (such as PEEK).

The frame 16 preferably includes a casing 20 made of metal material circumferentially surrounding at least the third pair of rings and the coil 28. In particular, no dedicated layer of insulating material is arranged between the casing 20 and the third pair of rings and the coil 28. The casing 20 thus performs the same field line closing function as the rings 29 and 30, and 25, 26, and 27. The casing 20 is preferably made of a ferromagnetic material such as 630 stainless steel.

The actuator 1 also includes a connector 31 enabling the coil 28 to be connected to an electrical power supply.

The actuator 1 preferably includes at least one sensor 32 in order to determine the position of the plug 7. For this purpose, in this example, the actuator 1 has a sensor 32 for detecting the position of the core 18 (which is representative of the position of the plug 7). For example, the sensor 32 is of the inductive type. The sensor 32 is typically fastened to the frame 16 so as to be arranged in line with the core 18 on the axis X. The sensor 32 is thus arranged in a thimble 36 located at the first end of the actuator 1. By way of example, the thimble 36 is made of PEEK.

The core 18 has a detection finger 37 made of appropriate material, which finger 37 is fastened to the free end of the core 18. Thus, depending on how far away the finger 37 is from the sensor 32 along the axis X, the sensor 32 can estimate the position of the core 18 and thus the position of the plug 7.

Consequently, the frame 16 enables the slide 17 and the sensor 32 to be received and to be isolated from the outside. Thus, in operation, powering the coil 28 causes one of the magnets to be attracted and the other magnet to be repelled, depending on the direction power is supplied to the coil 28, with co-operation between the pair of rings of the frame 16 with a respective one of the pair of rings of the core 18 serving to lock the plug 7 in each of its end positions when the coil 28 ceases to be powered.

As shown in FIG. 1, in a first position putting the admission channel 6 into communication with the first outlet 4, the plug 7 is in a first end position.

In order to cause the plug 7 to switch to its second end position, the coil 28 is powered in a first direction. This causes the first magnet 23 to be attracted and the second magnet 24 to be repelled, and thus causes the entire above-mentioned moving equipment E to be moved in translation along the axis X.

Movement of the core 18 causes the first pair of rings 25 and 26 to be secured to the third pair of rings 29 and 30 (by magnetic attraction); when the power supply to the coil 28 is switched off, the core 18 thus remains in position as a result of the above-mentioned pairs of rings being secured to each other.

In this position, as shown in FIG. 2, the plug 7 is then in its second end position enabling the admission channel 6 to be put into communication with the second outlet 5.

It should be observed that the pairs of rings are nevertheless offset a little from one another. This offset is intentional and is ensured by the action exerted by the springs on the core 18, in particular because the first spring 15 and the second spring 21 are stressed when the plug 7 is in its second end position.

By means of the offset, it is found to be much easier to cause the core 18 to switchback once more towards its first position.

For this purpose, in order to cause the plug 7 to switch back once more into its first end position, the coil 28 is powered in a second direction. This causes the second magnet 24 to be attracted and the first magnet 23 to be repelled and thus causes the entire above-mentioned moving equipment E to be moved in translation along the axis X.

The movement of the core 18 causes the second pair of rings 26 and 27 to be secured to the third pair of rings 29 and 30 (by magnetic attraction); when the power supply to the coil 28 is switched off, the core 18 remains in place because the above-mentioned pairs of rings are secured to each other. The plug 7 is thus once more blocked in its first end position, as shown in FIG. 1.

It should be observed that the pairs of rings are nevertheless offset a little from each other. This offset is intentional and is ensured by the action exerted by the springs on the core 18, in particular because the third spring 22 is stressed while the second spring 21 is in an equilibrium state when the plug 7 is in its first end position.

Because of this offset, it is found to be easier to cause the core 18 to switch back once more to its second position.

The springs thus serve to hold the core 18 in an offset position when the core becomes locked by magnetic attraction between pairs of rings.

Under such circumstances, in the event of a spring breaking, the plug 7 remains blocked in one or other of its extreme positions, thereby making it possible to detect a problem.

The valve 2 as described above is a bistable valve 2 (the valve 2 has only two equilibrium positions).

The associated actuator 1 as described is also simple to operate and requires little energy, since the coil 28 is not powered permanently. Specifically, a single "positive" or "negative" pulse of current suffices to cause the plug 7 to switch over from one end position to the other. The term "pulse" is used herein to mean a duration shorter than 50 milliseconds (ms), and preferably shorter than 35 ms.

Furthermore, the magnitude of the current passing through the coil 28 is not large, being of the order (in absolute value) of a few amps (A), and preferably less than 3 A.

The actuator 1 is connected to a control unit of the machine 100 (not shown herein) that is configured to power the coil 28 of the actuator 1 by means of pulses.

Furthermore, the actuator 1 is controlled electrically, thus making it possible for it to be located even in environments that are aseptic.

Furthermore, the actuator 1 is mounted on the valve 2 in sealed manner.

Naturally, the invention is not limited to the embodiment described and variants may be applied thereto without going beyond the ambit of the invention as defined by the claims.

In particular, although the present description relates to a three-port valve, the actuator could be associated with valves of other types, e.g. a two-port valve. The actuator may thus be of a shape different from that described, and for example it may present a plug having only one valve member, the actuator then requiring only two springs in order to hold the rings of the core offset relative to the rings of the frame, a first spring being arranged between the plug and the core and a second spring being arranged between the core and the frame of the actuator. This serves to re-balance the forces exerted by the springs on the core relative to the embodiment described above so that the pairs of rings remain offset when the core is locked in position.

Furthermore, the core and the plug may be fastened directly to each other (possibly with takeup clearance, since the core and the plug do not necessarily have the same stroke). This would make it possible to omit the spring connecting the core to the plug. In a variant, a connection element other than a spring could connect the core to the plug, such as a pad of elastomer material, or any other elastically deformable element.

In the same manner, it would be possible to use other elastically deformable elements for replacing the first spring and/or the third spring, e.g. pads of elastomer material.

The wall to which the bellows of the valve member is attached need not form part of the bellows.

The actuator could omit a metal casing, since the rings suffice on their own to loop field lines.

The sensor could be of capacitive type, of Hall effect type, etc.

The invention claimed is:

1. A valve actuator for a valve, the valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis, the actuator including a coil lying between two rings of ferromagnetic material, said coil and said two rings are secured to a frame of the actuator so as to surround the core, the core itself carries two magnets mounted in opposition on the core level with the coil, a first ring of ferromagnetic material lying between the two magnets that also lie between a second and a third rings of ferromagnetic material, the first and the second rings forming a first pair of rings of the core and the second and the third rings forming a second pair of rings of the core, applying power to the coil causing one of the magnets carried by the core to be attracted and the other magnet to be repelled depending on the direction in which the coil is powered, wherein co-operation between the pair of rings of the frame and the first pair of ring of the core serving to lock the plug in its first end position when the coil ceases to be powered and co-operation between the pair of rings of the frame and the second pair of ring of the core serving to lock the plug in its second end position when the coil ceases to be powered, the moving equipment also having at least two elastically deformable elements connected to the core in such a manner that the first pair of rings of the core and the second pair of rings of the core are both offset from the pair of rings of the frame while locking the plug in its first end position and the first pair of rings of the core and the second pair of rings of the core are both are offset from the pair of rings of the frame while locking the plug in its second end position, wherein in each of end positions of the plug, the first ring of the core is offset from each rings of the pair of rings of the frame, wherein in each of end positions of the plug, the second ring of the core is offset from each rings of the pair of rings of the frame, wherein in each of end positions of the plug, the second ring of the core is offset from each rings of the pair of rings of the frame.

2. The valve actuator according to claim 1, wherein the elastically deformable elements are springs.

3. The valve actuator according to claim 2, wherein a first spring of the moving equipment is arranged between the core and the frame, and a second spring of the moving equipment is arranged between the plug and a valve body.

4. The valve actuator according to claim 3, wherein the moving equipment includes a third spring arranged between the core and the plug.

5. The valve actuator according to claim 1, wherein the moving equipment includes a sealing element arranged between the plug and the frame of the actuator.

6. The valve actuator according to claim 5, wherein the sealing element is a bellows.

7. The valve actuator according to claim 1, wherein the actuator includes a proximity sensor for detecting the position of the core.

8. The valve actuator according to claim 7, wherein the sensor is an inductive sensor.

9. A valve including the valve actuator according to claim 1.

10. A machine comprising the valve actuator according to claim 1 and a valve associated with said valve actuator.

11. A machine according to claim 10, further comprising a control unit connected to the valve actuator in order to manage powering the coil of the actuator with pulses.

12. A valve actuator for a valve, the valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis, the actuator including a coil lying between two rings of ferromagnetic material, said coil and said two rings are secured to a frame of the actuator so as to surround the core, the core itself carries two magnets mounted in opposition on the core level with the coil, a ring of ferromagnetic material lying between the two magnets that also lie between two other rings of ferromagnetic material, applying power to the coil causing one of the magnets carried by the core to be attracted and the other magnet to be repelled depending on the direction in which the coil is powered, co-operation between the pair of rings of the frame and a respective one of the pairs of rings of the core serving to lock the plug in each of its end positions when the coil ceases to be powered, the moving equipment also having at least two elastically deformable elements connected to the core in such a manner that the pairs of rings of the core are offset from the pair of rings of the frame while locking the plug in each of its end positions, wherein the elastically deformable elements are springs, and wherein a first spring of the moving equipment is arranged between the core and the frame, and a second spring of the moving equipment is arranged between the plug and a valve body.

13. A valve actuator for a valve, the valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis, the actuator including a coil lying between two rings of ferromagnetic material, said coil and said two rings are secured to a frame of the actuator so as to surround the core, the core itself carries two magnets mounted in opposition on the core level with the coil, a ring of ferromagnetic material lying between the two magnets that also lie between two other rings of ferromagnetic material, applying power to the coil causing one of the magnets carried by the core to be attracted and the other magnet to be repelled depending on the direction in which the coil is powered, co-operation between the pair of rings of the frame and a respective one of the pairs of rings of the core serving to lock the plug in each of its end positions when the coil ceases to be powered, the moving equipment also having at least two elastically deformable elements connected to the core in such a manner that the pairs of rings of the core are offset from the pair of rings of the frame while locking the plug in each of its end positions, wherein the distance between the rings of the frame is shorter than the distance between the first and the third rings of the core.

14. A valve actuator for a valve, the valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis, the actuator including a coil lying between two rings of ferromagnetic material, said coil and said two rings are secured to a frame of the actuator so as to surround the core, the core itself carries two magnets mounted in opposition on the core level with the coil, a ring of ferromagnetic material lying between the two magnets that also lie between two other rings of ferromagnetic material, applying power to the coil causing one of the magnets carried by the core to be attracted and the other magnet to be repelled depending on the direction in which the coil is powered, co-operation between the pair of rings of the frame and a respective one of the pairs of rings of the core serving to lock the plug in each of its end positions when the coil ceases to be powered, the moving equipment also having at least two elastically deformable elements connected to the core in such a manner that the pairs of rings of the core are offset from the pair of rings of the frame while locking the plug in each of its end positions, wherein a first of the two rings of the frame is axially positioned between the first pair of the rings of the core for both plug end positions and a second of the two rings of the frame is axially positioned between the second pair of the rings of the core for both plus end positions.

15. A valve actuator for a valve, the valve actuator comprising moving equipment arranged to cause a plug of said equipment to slide along a given axis between two end positions, making it possible in service for the plug to put an admission channel of the valve into communication with at least one outlet of said valve, the moving equipment comprising a core constrained to move in translation with the plug along the given axis, the actuator including a coil lying between two rings of ferromagnetic material, said coil and said two rings are secured to a frame of the actuator so as to surround the core, the core itself carries two magnets mounted in opposition on the core level with the coil, a ring of ferromagnetic material lying between the two magnets that also lie between two other rings of ferromagnetic material, applying power to the coil causing one of the magnets carried by the core to be attracted and the other magnet to be repelled depending on the direction in which the coil is powered, co-operation between the pair of rings of the frame and a respective one of the pairs of rings of the core serving to lock the plug in each of its end positions when the coil ceases to be powered, the moving equipment also having at least two elastically deformable elements connected to the core in such a manner that the pairs of rings of the core do not overlap axially the pair of rings of the frame while locking the plug in each of its end position.

\* \* \* \* \*